United States Patent
Buell

[19]

[11] Patent Number: 6,091,164
[45] Date of Patent: Jul. 18, 2000

[54] SINGLE INVERTER WITH DUAL BOOST

[75] Inventor: Brian Jeffrey Buell, Gilbert, Ariz.

[73] Assignee: Durel Corporation, Chandler, Ariz.

[21] Appl. No.: 09/182,326

[22] Filed: Oct. 29, 1998

[51] Int. Cl.[7] .................................................. H02M 7/00
[52] U.S. Cl. .............................................. 307/82; 363/71
[58] Field of Search ............................. 307/82; 363/71; 323/222, 266, 272

[56] References Cited

U.S. PATENT DOCUMENTS

| | | | |
|---|---|---|---|
| 4,527,096 | 7/1985 | Kindlmann | 315/169.3 |
| 5,068,778 | 11/1991 | Kosem et al. | 364/138 |
| 5,313,141 | 5/1994 | Kimball | 315/169.3 |
| 5,349,269 | 9/1994 | Kimball | 315/169.3 |
| 5,418,434 | 5/1995 | Kamens et al. | 315/169.3 |

*Primary Examiner*—Shawn Riley
*Attorney, Agent, or Firm*—Paul F. Wille

[57] ABSTRACT

An inductive boost circuit is added in parallel with an inverter to increase current to an EL lamp. The inverter and the boost circuit each include a switching transistor. The switching transistor in the inductive boost circuit may be matched to the switching transistor in the inverter and may be driven synchronously with the switching transistor in the inverter.

11 Claims, 1 Drawing Sheet

SINGLE INVERTER WITH DUAL BOOST

BACKGROUND OF THE INVENTION

This invention relates to a battery operated power supply for an electroluminescent (EL) lamp and, in particular, to a plurality of inverters operating in concert for powering an EL lamp.

An EL lamp is essentially a capacitor having a dielectric layer between two conductive electrodes, one of which is transparent. The dielectric layer may include a phosphor powder or there may be a separate layer of phosphor powder adjacent the dielectric layer. The phosphor powder radiates light in the presence of a strong electric field, using very little current. Because an EL lamp is a capacitor, alternating current must be applied to the electrodes to cause the phosphor to glow, otherwise the capacitor charges to the applied voltage, the current through the EL lamp ceases, and the lamp stops producing light.

In portable electronic devices, automotive displays, and other applications where the power source is a low voltage battery, an EL lamp is powered by an inverter that converts direct current into alternating current. In order for an EL lamp to glow sufficiently, a peak-to-peak voltage in excess of about one hundred and twenty volts is necessary. The actual voltage depends on the construction of the lamp and, in particular, the field strength within the phosphor powder. The frequency of the alternating current through an EL lamp affects the life of the EL lamp, with frequencies between 200 hertz and 1000 hertz being preferred. Ionic migration occurs in the phosphor at frequencies below 200 hertz. Above 1000 hertz, the life of the phosphor is inversely proportional to frequency.

The prior art discloses several types of inverters including an inductive boost circuit having an inductor in series with a switching transistor. The energy stored in the inductor when the transistor is conducting is supplied to an EL lamp as a small current at high voltage when the transistor stops conducting. The voltage on the lamp is pumped up by a series of high frequency pulses from the inverter. The direct current produced by the inverter must be converted into an alternating current in order to power an EL lamp. U.S. Pat. No. 4,527,096 (Kindlmann) discloses a switching bridge to alternate the current through the lamp. The bridge changes the polarity of the current through the lamp at a low frequency (200–1000 hertz). Another solution is disclosed in U.S. Pat. No. 5,349,269 (Kimball), wherein a pair of inverters are used to alternately power an EL lamp. A first inverter charges the lamp to a first polarity and the second inverter charges the lamp to the opposite polarity. Yet another solution is disclosed in U.S. Pat. No. 5,313,117 (Kimball), wherein the inverter produces an AC voltage between a single output terminal and ground.

In the prior art, most of the applications for EL lamps required a lamp having an area of one to three square inches. As a result, commercially available EL drivers are low power ($\leq 400$ mW) devices. The SP4423 and SP4425 as sold by Sipex Corporation and the D358 inverter as sold by Durel Corporation are examples. There are many applications for EL lamps in which the area of the lamp exceeds five square inches. Existing inverters are not capable of providing sufficient power for these larger EL lamps.

In principle, adding power sources in parallel for increased current capacity is known. In practice, combining inverters has not been done, largely for economic reasons. The increased brightness comes at too high a cost.

U.S. Pat. No. 5,418,434 (Kamens et al.) discloses an inverter using two inductive boost circuits and discloses lower peak current drain compared to a conventional, single boost circuit. Average current, average power, and brightness are all the same as a single boost circuit. Alternately switching the inductors limits the duty cycle to $\leq 50\%$, reducing the efficiency of the individual boost circuits.

The EL lamp market is very cost sensitive and an implementation of the schematic shown in the Kamens et al. patent is likely to be more expensive than an inverter using a single boost circuit. In a boost circuit, the peak current determines the size (and cost) of the switching transistor. In the Kamens et al. circuit, if the peak current is reduced twenty-five percent, then the area of a switching transistor can be reduced a like amount. However, one needs two switching transistors. Thus, one actually needs about fifty percent more silicon (2×0.75=1.50) as for a boost circuit using a single transistor. Thus, the cost would be greater with no increase in brightness.

In view of the foregoing, it is therefore an object of the invention to provide an efficient power supply for driving large area lamps, e.g. lamps having an area greater than five square inches.

Another object of the invention is to provide a cost effective increase in brightness for low power inverters.

A further object of the invention is to provide a power supply for EL lamps having increased brightness.

Another object of the invention is to obtain an increased in brightness from a low power inverter without exceeding the power rating of the inverter.

SUMMARY OF THE INVENTION

The foregoing objects are achieved in the invention in which an inductive boost circuit is added in parallel with an inverter. The inverter and the boost circuit each include a switching transistor. The switching transistor in the inductive boost circuit may be matched to the switching transistor in the inverter and may be driven synchronously with the switching transistor in the inverter.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
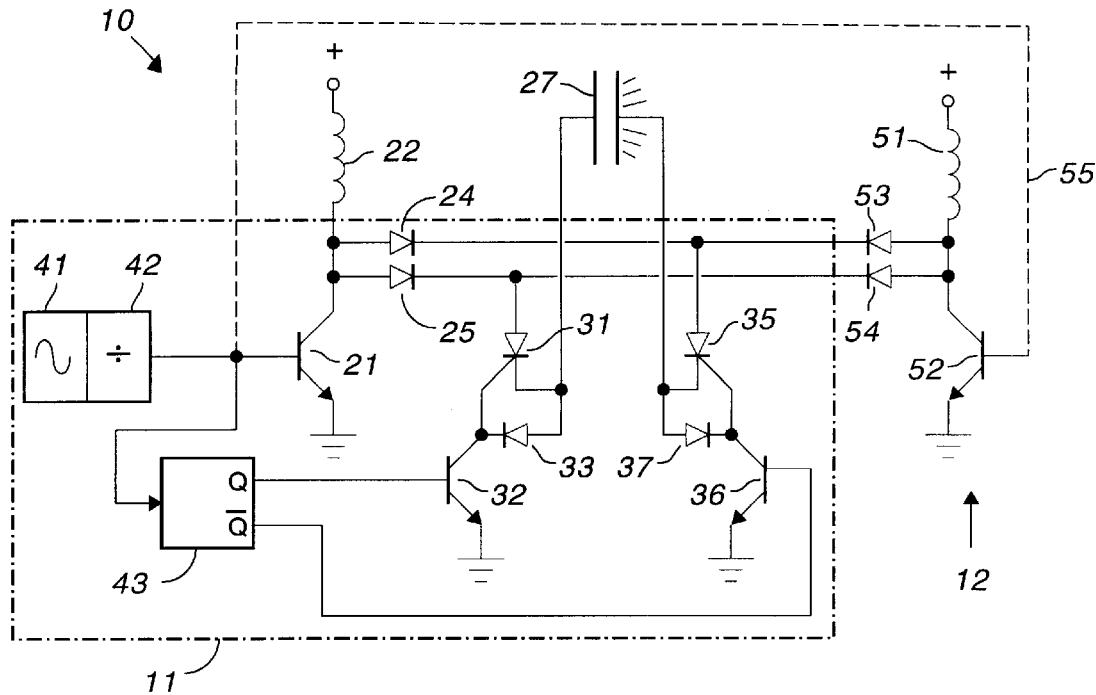
FIG. 1 is a schematic diagram of a power supply constructed in accordance with a preferred embodiment of the invention.

In FIG. 1, power supply 10 includes low power inverter 11 and boost circuit 12. Inverter 11 combines an inductive boost circuit with a bridge output, wherein the bridge acts as a double-pole, double-throw switch for converting DC to AC, in the manner disclosed in U.S. Pat. No. 4,527,096 (Kindlmann). When transistor 21 turns on, current flows through inductor 22, storing energy in the magnetic field produced by the inductor. When transistor 21 shuts off, the magnetic field collapses at a rate determined by the turn-off characteristics of transistor 21. The voltage across inductor 22 is proportional to the rate at which the field collapses ($\delta v/\delta t$). Thus, a low voltage and (relatively) large current is converted into a high voltage at a small current.

The current pulses are coupled through either diode 24 or diode 25 to the DC diagonal of a switching bridge having EL lamp 27 connected across the AC diagonal. The same amount of energy is supplied to lamp 27 each time that transistor 21 turns off and, therefore, the voltage on the lamp is pumped up by a series of current pulses from inductor 22 as transistor 21 repeatedly turns on and off. Diodes 24 and 25 isolate inductor 22 from the bridge circuit.

If transistor 21 were switched on and off continuously, the pulses would charge lamp 27 to the maximum voltage available from inductor 22, e.g. about 310 volts. Because an EL lamp needs an alternating current or a variable direct current, the lamp would glow initially and then extinguish when the capacitance of the lamp became fully charged. To avoid this problem, the devices in opposite sides of the bridge circuit alternately conduct to reverse the connections to lamp 27. The bridge circuit operates at a lower frequency than transistor 21; e.g. 200–1000 hz.

The left-hand side of the bridge circuit includes SCR 31 connected in series with transistor 32 through diode 33. The gate of SCR 31 is coupled to the junction of diode 33 and transistor 32. The right-hand side of the bridge circuit includes SCR 35 connected in series with transistor 36 through diode 37. The gate of SCR 35 is coupled to the junction of diode 33 and transistor 36.

Oscillator 41 produces an output signal that is reduced in frequency by divider 42 and coupled to the base of transistor 21 for switching the transistor at high frequency, e.g. 30 khz. The signal from oscillator 41 is further reduced by flip-flop 43, which has complementary outputs. One output of flip-flop 43 is coupled to the base of transistor 32 and the other output of the flip-flop is coupled to the base of transistor 35, thereby switching the transistors alternately. Flip-flop 43 includes one or more flip-flops to reduce the frequency of the signal from divider 42 to within the range of 200–1,000 hz.

The circuitry within dashed line 11 is essentially contained within a single integrated circuit, such as the 4423 device noted above. In accordance with the invention, boost circuit 12 is added in parallel with the inverter to increase the voltage on EL lamp 27. Boost circuit 12 includes inductor 51, transistor 52, diode 53, and diode 54 operating in the same manner as inductor 22, transistor 21, diode 24, and diode 25. The electrical characteristics of transistor 52 can match those of transistor 21 but need not. Suitable devices for transistor 52 include a type MPSA06 transistor or type MPSA42 transistor.

The base of transistor 52 is optionally coupled to the base of transistor 21 by conductor 55. Transistors 21 and 52 operate in synchronism but need not. The duty cycle of transistors 21 and 52 is determined by the signal from divider 42 and is typically about seventy-five percent. The bridge circuit formed by SCR 31, SCR 35, transistor 32, and transistor 36 switch the pulses from inductors 22 and 52 from one side of EL lamp 27 to the other at low frequency. Diodes 24 and 53, and diodes 25 and 54, act as OR gates for the pulses from inductors 22 and 51, enabling asynchronous operation if desired. Asynchronous operation imposes no restrictions on duty cycle.

The combination of inverter 11 and boost circuit 12 provides approximately twice the brightness at approximately 125% of the cost of the inverter alone. Thus, one can increase the brightness of large area lamps in battery operated devices at low cost without exceeding the power dissipation limits of the inverter.

Figure 2:
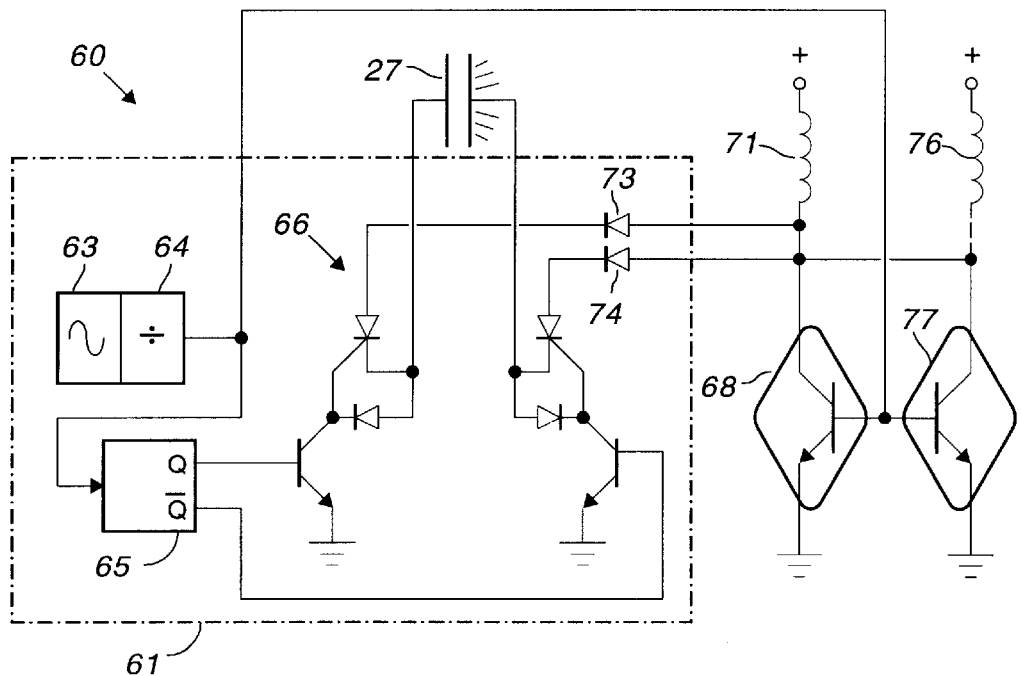
FIG. 2 is a schematic diagram of a power supply constructed in accordance with an alternative embodiment of the invention.

In FIG. 2, power supply 60 includes at least one, external, discrete power transistor for a boost circuit and an H-bridge for directing the pulses from the boost circuit to either side of an EL lamp. Specifically, integrated circuit 61 includes oscillator 63, divider 64, and flip-flop 65. Divider 64 drives the external switching devices in common. Bridge circuit 66 is constructed as described in connection with FIG. 1 and is coupled to the complementary outputs of flip-flop 65, whereby the bridge switches synchronously with transistors 68 and 77. A boost circuit (not shown), if any, within integrated circuit 61 is not used.

Inductor 71 is connected in series with transistor 68 and their junction is coupled to bridge circuit 66 through diodes 73 and 74. Transistor 77 is connected in parallel with transistor 68 and is preferably driven in common with transistor 68. Inductor 76 is optionally provided, connected in series with transistor 77 between supply and common. Transistors 68 and 77 switch at high frequency to boost the voltage on lamp 27. If paired with inductor 71, the two transistors increase the current through the inductor and, therefore, the boost voltage. If separate inductors are used, the currents from the inductors additively combine to increase the energy applied, per pulse, to lamp 27.

A TO-3 case outline is used in FIG. 2 to represent power transistors but this does not mean that only transistors in TO-3 packages can be used. Suitable devices for transistors 68 and 77 include a type MPSA06 transistor or type MPSA42 transistor. Even though transistors 68 and 77 are power transistors, the cost of making an external power transistor is often less than providing a transistor of the same current handling capability in an integrated circuit. Thus, the circuit of FIG. 2 provides increased power and brightness at lower cost than devices in the prior art.

The invention thus provides an efficient power supply for powering large area lamps and an increase in brightness from low power inverters without exceeding the power rating of the inverter. A power supply constructed in accordance with the invention provides increased brightness and high efficiency.

Having thus described the invention, it will be apparent to those of skill in the art that many modifications can be made with the scope of the invention. For example, the external transistor can be bipolar or FET. Additional switching transistors can be added to boost circuit 12 for increasing the current through inductor 51. Additional boost circuits can be added in parallel with transistor 68 and inductor 71. An external boost circuit can take the form of a second inverter connected in parallel with the first inverter but this doubles the cost of doubling the brightness, rather than doubling the brightness for a twenty-five percent increase in cost, as is the case of the embodiments of FIGS. 1 and 2. Transistors 68 and 77 can be driven separately; i.e. not turned on and off at the same times.

What is claimed as the invention is:

1. A power supply for an electroluminescent lamp, said power supply comprising:

a first integrated circuit containing a first low power inverter for driving said lamp, said first low power inverter including a first inductive boost circuit;

a second inductive boost circuit, external to said first integrated circuit, coupled in parallel with said first low power inverter for increasing the current supplied to said lamp.

2. The power supply as set forth in claim 1 wherein said first inductive boost circuit includes a first switching transistor and said second inductive boost circuit includes a second switching transistor.

3. The power supply as set forth in claim 2 wherein said first switching transistor and said second switching transistor are matched.

4. The power supply as set forth in claim 2 wherein said first switching transistor and said second switching transistor are not matched.

5. The power supply as set forth in claim 4 wherein said second switching transistor is a power transistor.

6. The power supply as set forth in claim 2 wherein said first switching transistor and said second switching transistor are driven in synchronism.

7. A power supply for an electroluminescent lamp, said power supply comprising:

an integrated circuit containing a switching bridge circuit having an AC diagonal adapted to be connected to said lamp and a DC diagonal;

an inductive boost circuit, external to said integrated circuit, coupled to said DC diagonal;

wherein said inductive boost circuit includes a first inductor and at least two switching transistors in parallel with each other and in series with said first inductor.

8. The power supply as set forth in claim 7 and further including a second inductor in parallel with said first inductor.

9. The power supply as set forth in claim 7 wherein said integrated circuit includes timing circuitry for driving said switching transistors simultaneously.

10. The power supply as set forth in claim 9 wherein said switching bridge and said transistors are driven in synchronism.

11. The power supply as set forth in claim 9 wherein said switching bridge and said transistors are driven independently.

* * * * *